(12) United States Patent
Steiss et al.

(10) Patent No.: US 7,739,426 B1
(45) Date of Patent: Jun. 15, 2010

(54) DESCRIPTOR TRANSFER LOGIC

(75) Inventors: Donald E. Steiss, Richardson, TX (US); Christopher E. White, Plano, TX (US); Jonathan Rosen, Cary, NC (US); John A. Fingerhut, Mission Viego, CA (US); Barry S. Burns, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

(21) Appl. No.: 11/555,066

(22) Filed: Oct. 31, 2006

Related U.S. Application Data

(60) Provisional application No. 60/732,079, filed on Oct. 31, 2005.

(51) Int. Cl.
*G06F 3/00* (2006.01)
(52) U.S. Cl. .................... 710/52; 710/56; 710/54; 710/53; 710/58
(58) Field of Classification Search .................... None
See application file for complete search history.

(56) References Cited

U.S. PATENT DOCUMENTS

| 4,442,484 A | 4/1984 | Childs et al. |
|---|---|---|
| 4,491,945 A | 1/1985 | Turner |
| 4,494,230 A | 1/1985 | Turner |
| 4,630,260 A | 12/1986 | Toy et al. |
| 4,734,907 A | 3/1988 | Turner |
| 4,755,986 A | 7/1988 | Hirata |
| 4,829,227 A | 5/1989 | Turner |
| 4,849,968 A | 7/1989 | Turner |
| 4,866,701 A | 9/1989 | Giacopelli et al. |
| 4,893,304 A | 1/1990 | Giacopelli et al. |
| 4,901,309 A | 2/1990 | Turner |
| 5,127,000 A | 6/1992 | Henrion |
| 5,151,988 A | 9/1992 | Yamagishi |
| 5,173,897 A | 12/1992 | Schrodi et al. |
| 5,179,551 A | 1/1993 | Turner |
| 5,179,556 A | 1/1993 | Turner |

(Continued)

FOREIGN PATENT DOCUMENTS

EP    1085723    5/2003

(Continued)

OTHER PUBLICATIONS

Trancoso et al., "The Impact of Speeding up Critical Sections with Data Prefetching and Forwarding", 1996 International Conference on Parallel Processing, pp. 111-79-111-86, 1996 IEEE.

(Continued)

*Primary Examiner*—Ilwoo Park
*Assistant Examiner*—Aurangzeb Hassan
(74) *Attorney, Agent, or Firm*—Stolowitz Ford Cowger LLP

(57) ABSTRACT

A processing engine includes descriptor transfer logic that receives descriptors generated by a software controlled general purpose processing element. The descriptor transfer logic manages transactions that send the descriptors to resources for execution and receive responses back from the resources in response to the sent descriptors. The descriptor transfer logic can manage the allocation and operation of buffers and registers that initiate the transaction, track the status of the transaction, and receive the responses back from the resources all on behalf of the general purpose processing element.

20 Claims, 10 Drawing Sheets

U.S. PATENT DOCUMENTS

| | | | |
|---|---|---|---|
| 5,229,991 | A | 7/1993 | Turner |
| 5,247,629 | A | 9/1993 | Casamatta et al. |
| 5,253,251 | A | 10/1993 | Aramaki |
| 5,260,935 | A | 11/1993 | Turner |
| 5,327,556 | A | 7/1994 | Mohan et al. |
| 5,339,311 | A | 8/1994 | Turner |
| 5,402,415 | A | 3/1995 | Turner |
| 5,430,850 | A | 7/1995 | Papadopoulos et al. |
| 5,450,411 | A | 9/1995 | Heil |
| 5,551,046 | A | 8/1996 | Mohan et al. |
| 5,682,537 | A | 10/1997 | Davies et al. |
| 5,699,500 | A | 12/1997 | Dasgupta |
| 5,842,040 | A | 11/1998 | Hughes et al. |
| 5,845,129 | A | 12/1998 | Wendorf et al. |
| 5,845,147 | A | 12/1998 | Vishlitzky et al. |
| 5,896,501 | A | 4/1999 | Ikeda et al. |
| 5,905,725 | A | 5/1999 | Sindhu et al. |
| 5,949,780 | A | 9/1999 | Gopinath |
| 5,987,506 | A | 11/1999 | Carter et al. |
| 6,032,190 | A | 2/2000 | Bremer et al. |
| 6,128,666 | A | 10/2000 | Muller et al. |
| 6,161,144 | A | 12/2000 | Michaels et al. |
| 6,163,856 | A | 12/2000 | Dion et al. |
| 6,170,025 | B1 | 1/2001 | Drottar et al. |
| 6,253,273 | B1 | 6/2001 | Blumenau |
| 6,405,274 | B1 | 6/2002 | Chan |
| 6,411,983 | B1 | 6/2002 | Gallop |
| 6,473,849 | B1 | 10/2002 | Keller et al. |
| 6,529,983 | B1 | 3/2003 | Marshall et al. |
| 6,553,464 | B1 | 4/2003 | Kamvysselis et al. |
| 6,563,790 | B1 | 5/2003 | Yu et al. |
| 6,601,138 | B2 | 7/2003 | Otterness |
| 6,920,447 | B2 | 7/2005 | Pudipeddi et al. |
| 6,947,425 | B1 | 9/2005 | Hooper et al. |
| 7,093,027 | B1 | 8/2006 | Shabtay et al. |
| 7,100,020 | B1 | 8/2006 | Brightman et al. |
| 7,120,631 | B1 | 10/2006 | Vahalia et al. |
| 7,210,022 | B2 | 4/2007 | Jungck et al. |
| 7,304,999 | B2 | 12/2007 | Sukonik et al. |
| 7,313,557 | B1 | 12/2007 | Noveck |
| 7,362,762 | B2 | 4/2008 | Williams et al. |
| 7,404,015 | B2 | 7/2008 | Zemach et al. |
| 7,551,617 | B2 | 6/2009 | Eatherton et al. |
| 2001/0049744 | A1 | 12/2001 | Hussey et al. |
| 2002/0080789 | A1 | 6/2002 | Henderson et al. |
| 2002/0184216 | A1 | 12/2002 | Chandrasekaran et al. |
| 2004/0037322 | A1 | 2/2004 | Sukonik et al. |
| 2004/0039787 | A1 | 2/2004 | Zemach et al. |
| 2004/0039815 | A1 | 2/2004 | Evans et al. |
| 2004/0117790 | A1 | 6/2004 | Rhine |
| 2004/0143712 | A1 | 7/2004 | Armstrong et al. |
| 2005/0015686 | A1 | 1/2005 | Atoji et al. |
| 2005/0100017 | A1 | 5/2005 | Williams et al. |
| 2005/0163143 | A1 | 7/2005 | Kalantar et al. |
| 2005/0216461 | A1 | 9/2005 | Williams et al. |
| 2005/0220112 | A1 | 10/2005 | Williams et al. |
| 2006/0179156 | A1 | 8/2006 | Eatherton et al. |
| 2006/0179204 | A1 | 8/2006 | Cohen et al. |
| 2006/0221823 | A1 | 10/2006 | Shoham |
| 2007/0008989 | A1 | 1/2007 | Joglekar |
| 2007/0014240 | A1 | 1/2007 | Kumar et al. |
| 2007/0022084 | A1 | 1/2007 | Cohen |
| 2007/0022429 | A1 | 1/2007 | Rosenbluth et al. |
| 2007/0050671 | A1 | 3/2007 | Markevitch |
| 2007/0198792 | A1 | 8/2007 | Dice et al. |

FOREIGN PATENT DOCUMENTS

| | | |
|---|---|---|
| WO | 0209307 | 1/2002 |
| WO | 0239667 | 5/2002 |
| WO | WO 2004019571 | 3/2004 |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington University, St. Louis MO, 20 pages.

Yun et al. "An Efficient Locking Protocol for the Home Based Lazy Release Consistency," Proceedings of the First IEEE/ACM International Symposium on Cluster Computing and the Grid, pp. 527-532; May 2001.

Stolowitz Ford Cowger LLP, Listing of Related Cases Jul. 13, 2009.

PCT/US2006/000602; International Preliminary Report on Patentability and Written Opinion of the International Searching Authority; Issued Mar. 10, 2009.

PCT/US2006/000602; International Search Report and Written Opinion; Mailed Jan. 29, 2008.

Amiri et al. "Highly Concurrent Shared Storage," Proceedings of the international Conference on Distributed Computing Systems, Taipei, Apr. 2000.

| RBUF REGION ID | SKIP COUNT | VALID | WAIT | RELEASE RBUF | TRANSACTION ID | ERROR |
|---|---|---|---|---|---|---|
| 42A | 42B | 42C | 42D | 42E | 42F | 42G |

HANDLE 40

FIG.4

| RESOURCE IDENTIFIER OF DESTINATION TRANSACTION | RESPONSE COUNT | ACKNOWLEDGE COUNT | DISABLE EXCEPTIONS | DISABLE TIME EXCEPTIONS | RESOURCE ID VALID | RELEASE RESOURCE | WAIT |
|---|---|---|---|---|---|---|---|
| 24A | 24B | 24C | 24D | 24E | 24F | 24G | 24H |

COP_SEND 24

FIG.5

DESCRIPTOR TRANSFER LOGIC

FIELD OF THE INVENTION

The present disclosure relates generally to computer architectures.

OVERVIEW

Packet switching networks, such as Internet Protocol (IP) networks, have increased the demand for higher-speed services in support of those networks. This includes network processing devices such as routers, switches, gateways, network servers, etc., that handle the packets transferred over the IP networks. Some network processing device architectures use one or more general purpose software programmable processors that access other resources, such as internal and external memory, peripherals, specialized micro-engines, and any other processing resource.

A significant amount of processing bandwidth is used by the general purpose processor when managing the transactions to and from these co-processing resources. For example, the general purpose processor may use a substantial number of processing cycles queuing the transactions for sending to the other resources, monitoring the status of the transactions, keeping track of which transactions have been sent to which resources, allocating memory for receiving responses back from the resources, and confirming that the transactions are successfully completed.

BRIEF DESCRIPTION OF THE DRAWINGS

FIG. 4 is a diagram showing some of the fields used in a handle.

FIG. 5 shows some of the fields used in a COP_SEND register used in the DTL.

The foregoing and other objects, features and advantages will become readily apparent from the following detailed description of a preferred embodiment which proceeds with reference to the accompanying drawings.

DETAILED DESCRIPTION

Overview

A processing engine includes descriptor transfer logic that receives descriptors generated by a software controlled general purpose processing element. The descriptor transfer logic manages transactions that send the descriptors to resources for execution and receive responses back from the resources in response to the sent descriptors. The descriptor transfer logic can manage the allocation and operation of buffers and registers that initiate the transaction, track the status of the transaction, and receive the responses back from the resources all on behalf of the general purpose processing element.

Figure 1:
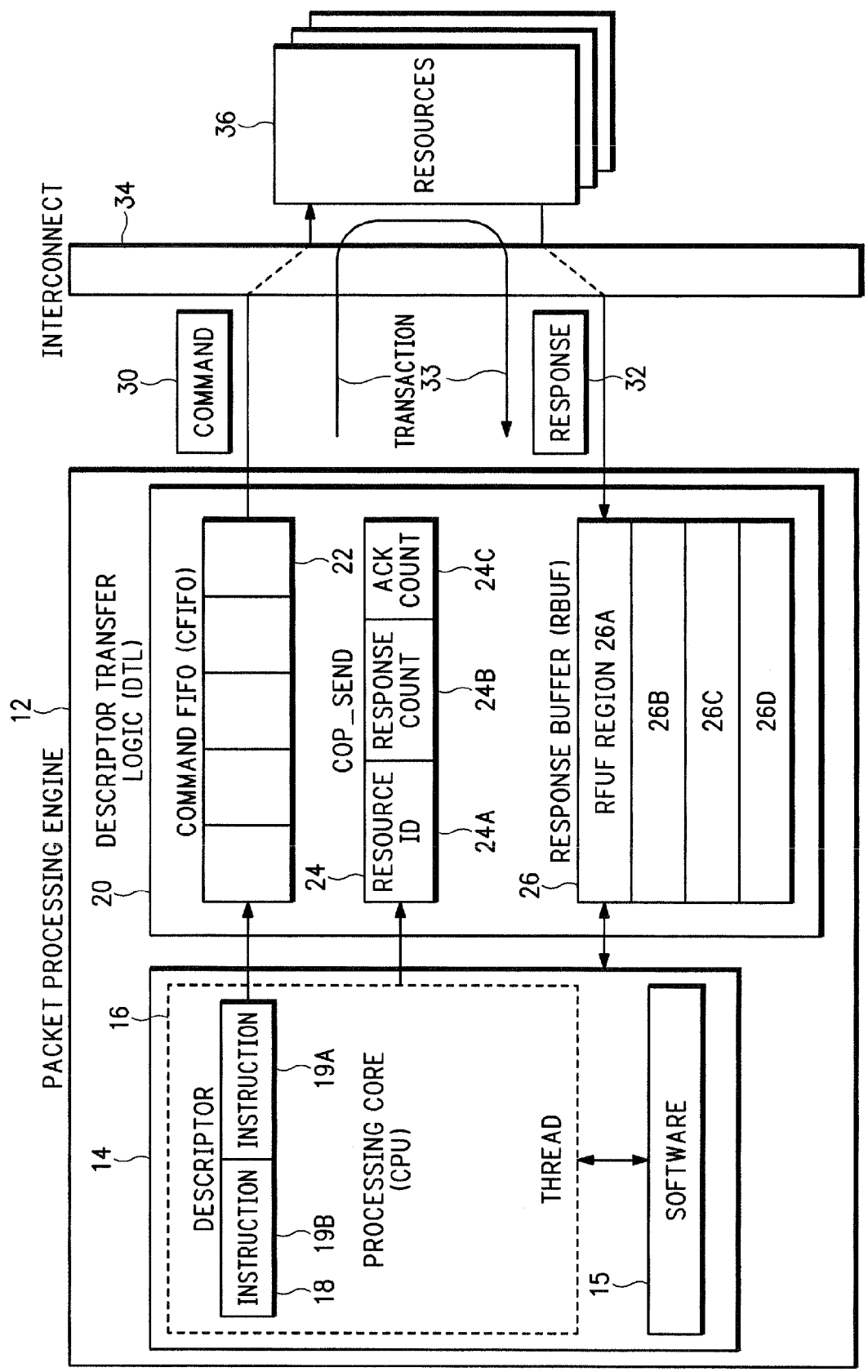
FIG. 1 is a diagram of Descriptor Transfer Logic (DTL) used in a Packet Processing Engine.

FIG. 1 shows a Packet Processing Engine (PPE) 12 that is connected through an interconnect 34 to multiple different resources 36. In one embodiment, the PPE 12 includes a processing core 14 alternatively referred to as a Central Processing Unit (CPU). The CPU 14 can be a relatively general purpose processor that executes different software instructions 15. In one embodiment, the software instructions 15 are used for processing Internet Protocol (IP) packets. However, other types of software instructions 15 and processing applications can alternatively be executed by CPU 14 that are unrelated to packet processing. The resources 36 can include any type of internal and/or external memory, Reduced Instruction Set (RISC) processors, Digital Signal Processors (DSPs), graphic processors, peripherals, or any other computer or co-processing element that may be used by the CPU 12 when processing information.

The PPE 12 sends different commands 30 over the interconnect 34 to targeted resources 36. The commands 30 can include any combination of data and control information. The targeted resources 36 process the commands 30 and send responses 32 back over the interconnect 34 to the PPE 12. The responses 32 can also include any combination of data and control information.

The interconnect 34 and the protocols used for sending commands over the interconnect 34 and receiving responses back from the resources over the interconnect 34 are described in co-pending U.S. patent application Ser. No. 11/293,285, filed Dec. 1, 2005, entitled: METHOD AND APPARATUS FOR COMMUNICATING OVER A RESOURCE INTERCONNECT, which is herein incorporated by reference in its entirety.

Descriptor Transfer Logic

The PPE 12 includes novel Descriptor Transfer Logic (DTL) 20 that manages many of the tasks for sending commands 30 over the interconnect 34 to the different resources 36, monitoring the status of the sent commands 30, and allocating space for the responses 32 received back from the resources 36. The CPU 14 generates descriptors 18 that include the data and control information that is then formatted into the command 30 sent to the resource 36. The command 30 contains the data and instructions used by the resource 36 to provide independent processing operations requested by the CPU 14. The resource 36 executes the command 30 and sends back a response 32 containing either the results of the processing or an alternative acknowledgement that the processing has been completed.

The descriptor 18 may contain multiple batched instructions 19A and 19B each directed to the same resource 36. The CPU 14 formats the one or more instructions 19 into the descriptor 18 and then sends that descriptor 18 to the DTL 20. The DTL 20 then uses hardware to manage the transaction 33 that formats the descriptor 18 into the command 30, sends the command 30 to the resource 36, and receives the response 32 back from the resource 36. This process of formatting information into a command 30, sending of the command 30 to the resource 36, and receiving the associated response 32 back from the resource 36 is referred to generally as a transaction 33.

Command FIFO

The CPU 14 sends one or more descriptors 18 to a Command First-In First-Out (CFIFO) buffer 22. The CPU 14 then writes to a COP_SEND register 24 to notify the DTL 20 that a complete descriptor 18 has been loaded into CFIFO 22. The DTL 20 takes over the management of the transaction 33 after the CPU 14 writes to the COP_SEND register 24. This includes the DTL 20 formatting the descriptor into a command 30 and coordinating the transfer of the command 30 to one of the resources 36 and then receiving the response 32 back from the resource 36 pursuant to the command 30. Managing the transfer of the command 30 may also include submitting a send request to an arbitrator (not shown) and then queuing the command 30 until the send request is granted.

Another descriptor 18 for a second transaction 33 can be written to the CFIFO 22, even while the previous descriptor 18 is still residing in the CFIFO 22 waiting for access to the interconnect 34 or while the command 30 for the previous descriptor 18 is still being transmitted to the resource 36. The descriptor entries in CFIFO 22 are freed as soon as the descriptor 18 is transmitted.

Response Buffer

The DTL 20 also manages memory for storing the responses 32 received back from the resources 36. The DTL 20 includes a Response Buffer (RBUF) 26 that includes multiple different regions 26A-26D that can each be associated with a different transaction 33. The DTL 20 pre-allocates one of the multiple regions 26A-26D to receive the response 32 for a particular transaction 33. When the response 32 for that transaction 33 is received back from the resource 36, the DTL 20 loads the response into the pre-allocated RBUF region 26A-26D. RBUF 26 is directly addressable by the CPU 14 and the DTL 20 can write response data 32 into the RBUF 26 while software instructions 15 executed by CPU 14 simultaneously read data from RBUF 26.

Transaction Overview

The CPU 14 writes a value into resource ID field 24A of the COP_SEND register 24 to identify the resource 36 targeted for the transaction 33. The CPU 14 also loads a value into a response count field 24B of the COP_SEND register 24 indicating how much space the DTL 20 should allocate in the RBUF 26 for the response 32. The CPU 14 also writes a value into an acknowledge count field 24C indicating to the DTL 20 a total amount of data that should be returned in response 32.

Figure 2:
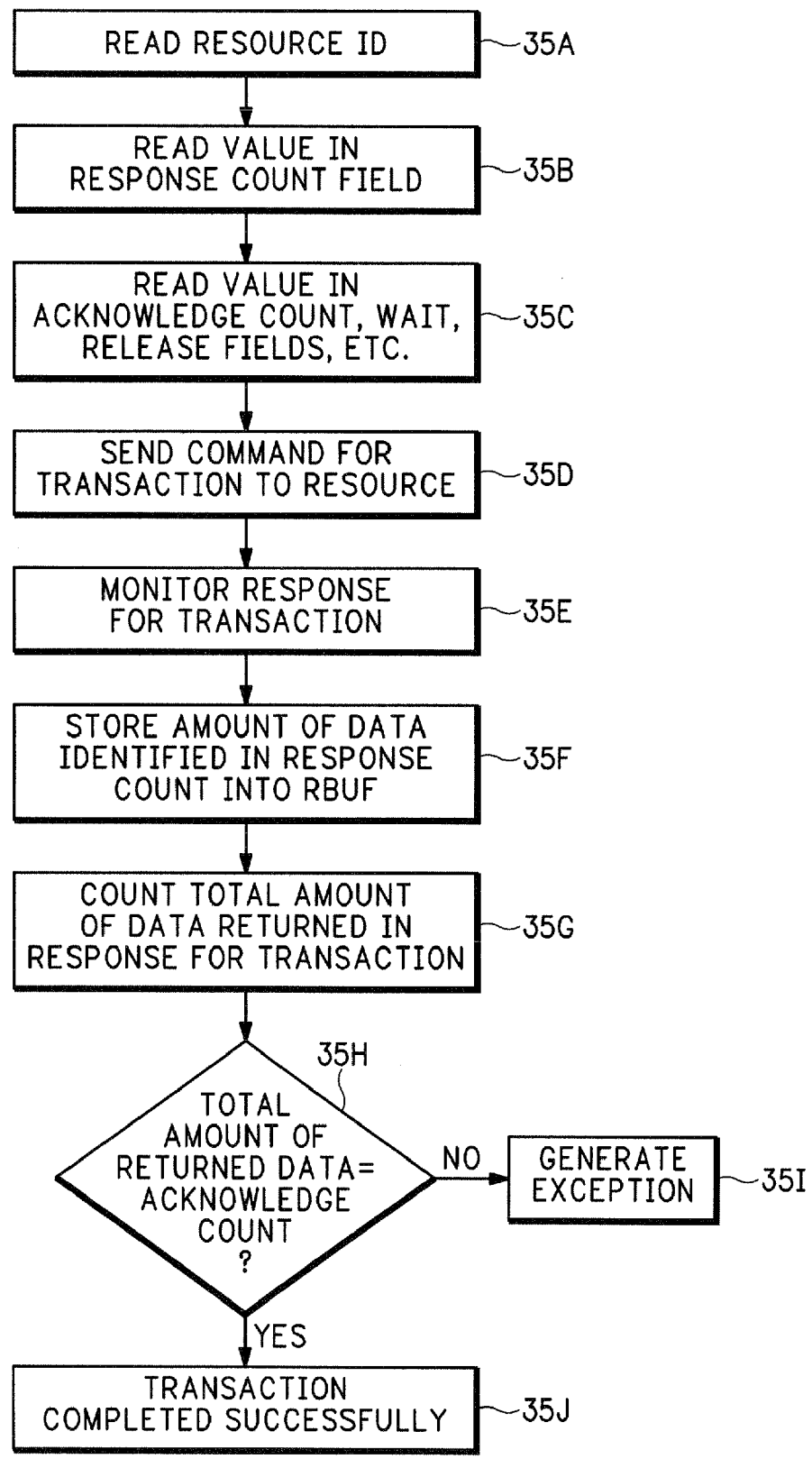
FIG. 2 is a flow diagram showing how the DTL in FIG. 1 manages a transaction.

Referring to FIGS. 1 and 2, after the CPU 14 completes writing into the COP_SEND register 24, the DTL 20 takes over the management of the associated transaction 33. In operation 35A the DTL 20 reads the value in the resource ID field 24A, in operation 24B reads the value in the response count field 24B, and in operation 35C reads the value in the acknowledge count field 24C. Other fields such as a wait field and a release field may also be read. The operations performed by the DTL 20 pursuant to values in some of these other COP_SEND fields are described in more detail below.

In operation 35D, the DTL 20 formats and sends a command 30 for the descriptor 18 to the resource 36 identified in field 24A. The DTL 20 monitors any transaction response 32 received back from resource 36 in operation 35E. In operation 35F, the returned response 32 is written into the pre-allocated region in RBUF 26 until the expected response count in field 24B has expired. Response data 32 received after this point is still tracked in operation 35G, but considered resource acknowledgments and discarded.

Operation 35F compares the total amount of returned response data 32 with the acknowledgement count in field 24C. The DTL 20 generates an exception in operation 351 if the total amount of returned response data does not equal the acknowledgement count value in field 24C. Otherwise the transaction completes successfully in operation 35J.

The DTL 20 does not need to parse the data in CFIFO 22 prior to issuing the commands 30 to the resource interconnect 34 (FIG. 1). In particular, the DTL 20 does not need to be aware of the structure of the command 30, does not need to determine how many commands 30 are batched together to form a single transfer, and does not need to determine the proper amount of response data 32 to expect. This information is provided by the CPU 14 which determines and programs the expected amount of response data 32 into response count field 24B and acknowledge count field 24C of COP_SEND register 24.

For example, the descriptor 18 generated by the CPU 14 may include two instructions 19A and 19B. Possibly, only response data for the first instruction 19A may need to be stored in the RBUF 26. For instance, the first instruction 19A may be a read instruction that returns data from memory while the second instruction 19B may be a write instruction that is not expected to return data and only returns an acknowledgement.

Accordingly, the CPU 14 may write a value of 1 into the response count field 24B directing the DTL 20 to only store a first group of data in RBUF 26. The CPU 14 also writes a value of 2 into the acknowledge count field 24C of COP_SEND register 24. This notifies the DTL 20 that two sets of information should be returned from the resource 36, one set for instruction 19A, and one set for instruction 19B.

Descriptor Transfer Handles

Figure 3:
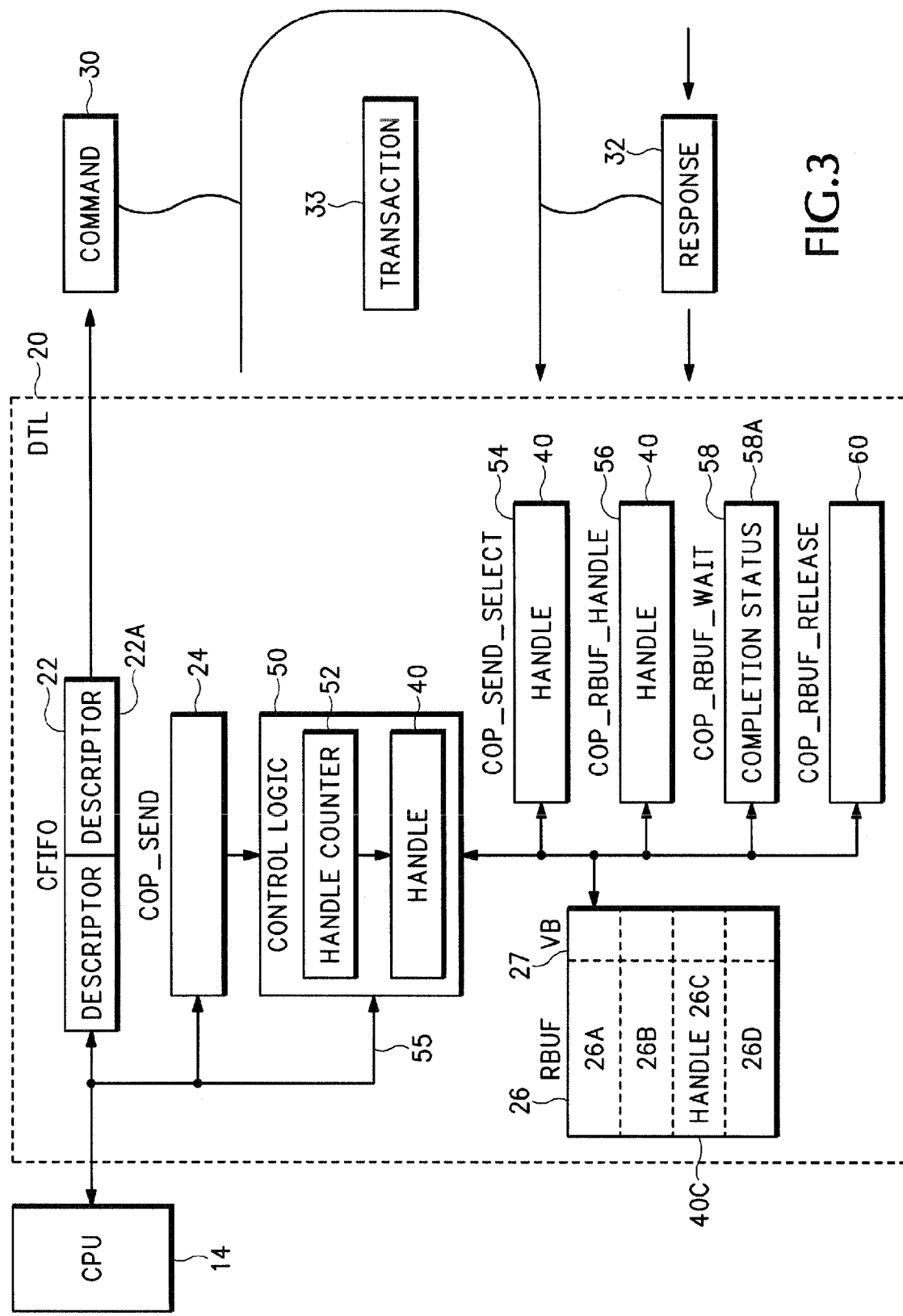
FIG. 3 is a diagram showing how the DTL uses handles to manage transactions.

The DTL 20 uses a scheme which allows software 15 to easily track status of transactions 33. Central to this scheme is the concept of a handle, which provides a unique identifier for every transaction 33 issued via writing to the COP_SEND register 24. FIG. 3 shows how the handle is used in the DTL 20 and FIG. 4 shows one example of a handle 40 that may be generated by control logic 50 in the DTL 20 shown in FIG. 3.

Referring both to FIGS. 3 and 4, once a complete descriptor 18 has been loaded into CFIFO 22, the CPU 14 writes to the COP_SEND register 24 to initiate a new transaction 33. In response, the logic 50 generates a handle 40 associated with that particular transaction 33. The handle 40, or some version of the handle 40, is then stored in the COP_SEND_SELECT register 54 and in RBUF 26. The handle 40 is then read back by the CPU 14 from the COP_SEND_SELECT register 54 to quickly identify the status and response information 32 for the associated transaction 33. The processor 16 (FIG. 1) reads the handle from the COP_SEND_SELECT register 54 after initiating a transaction and then stores it in memory. Some time later, the processor 16 can use the handle to identify the status and response information for the associated transaction.

A handle counter 52 increments every time the COP_SEND register 24 is written initiating a new transaction 33. The handle counter 52 is used to generate unique values for the handle within the confines of a same thread. In other words, each transaction 33 has an associated handle, and each handle contains a unique value associated with that transaction. When the CPU 14 writes to the COP_SEND register 24, the control logic 50 generates a new handle 40 and assigns that handle to the new transaction 33. As part of this process, an unused RBUF region 26A-26D is selected by the control logic 50 to receive the response data 32 for transaction 33. A corresponding pointer to the allocated RBUF region is loaded into an RBUF region ID field 42A in the handle 40 (see FIG. 4).

The control logic 50 sets a valid bit field 42C in the handle 40 indicating a valid handle. The control logic 50 may also set a wait field 42D in the handle 40 according to the setting of a corresponding wait field 24H in the COP_SEND register 24 (see FIG. 5).

A release RBUF field 42E in the handle 40 is assigned based on the value of a release resource field 24G in the COP_SEND register 24. A current value of the handle counter 52 in FIG. 2 is captured by the control logic 50 and assigned to the transaction ID field 42F in the handle 40. The counter 52 is then incremented by the control logic 50. An error field 42G may be initially set to zero. Later, if the associated transaction 33 results in an error, the control logic 50 can change the value in error field 42G.

The new handle 40 is stored in the DTL 20 and remains valid until released by the CPU 14. Once the handle 40 is generated, software 15 (FIG. 1) may retrieve the handle 40 and later use it to perform management functions associated with the associated transaction 33 or to locate the response data 32 stored in RBUF 26 for the completed transaction 33. These management functions are initiated by the CPU 14 reading or writing various DTL registers 24, and 54-60. The details of each of these registers and their associated function are described below.

The RBUF region ID field 42A of the handle 40 is typically used to select one of the four RBUF regions 26A-26D for execution of an operation. To perform a handle comparison, both the valid bit in the handle provided by the CPU 14 and the handle 40 stored with the RBUF region 26 are set, indicating validity. The count field 42F of the handle 40 is then compared to the count field of the handle 40 associated with the RBUF 26. If the count fields 42F are identical, then the handles match.

The handle comparison can be overridden and the RBUF region state accessed directly by using the skip count field 42B of the handle 40. Setting the skip count field 42B suppresses the count field comparison and valid bit checking between the handle 40 associated with RBUF 26 and the handle 40 provided by the CPU 14. Setting the skip count field 42B allows exception handlers and other entities in the DTL 20 which have no knowledge of specific descriptor handles to still access data and state information in RBUF 26.

COP_SEND

Referring to FIGS. 3 and 5, reading the COP_SEND register by the CPU 14 returns the count of data words pushed onto the CFIFO 22. Specifically, the count represents the number of data words written to CFIFO 22 since the last write of COP_SEND 24. The control logic 50 maintains this count which is incremented for every write to the CFIFO 22, decremented at every read to CFIFO 22, and is cleared when the CPU 14 writes to the COP_SEND register 24.

Writing the COP_SEND register 24 instructs the control logic 50 to begin transferring the next command 30 to the resource identified in resource ID field 24A. The data transferred in command 30 includes all of the descriptor entries written into CFIFO 22 since the last write to the COP_SEND register 24 by the CPU 14. The control logic 50 also tracks the number of data words in CFIFO 22 which is then cleared each time the CPU 14 writes to the COP_SEND register 24.

As described above, the response count field 24B is loaded by the CPU 14 to identify the amount of response data 32 the control logic 50 needs to save in the RBUF 26. As also described above, the acknowledge count field 24C is loaded by the CPU 14 to identify the amount of data expected to be returned in response 32. The acknowledge count field 24C allows the control logic 50 to determine when a particular transaction 33 has been successfully completed.

A disable exceptions field 24D causes the DTL 20 to disable some or all exception notifications. However, other error codes generated by the resources 36 may still be written into the RBUF 26. These exceptions are described in more detail below. A disable time exception field 24E disables the control logic 50 from generating an exception when a transaction 33 has not completed after some particular time period.

If a resource ID valid field 24F is set, the control logic 50 in FIG. 3 assumes that a valid encoded resource ID resides in the resource ID field 24A of the COP_SEND register 24. In this case, the value in resource ID field 24A is simply copied into the requisite channel and RBUF region. If the resource ID valid field 24F is cleared, the control logic 50 assumes that a second entry read from CFIFO 22 contains the target address of the transaction 33.

A wait (block until complete) field 24H when set by the CPU 14 causes the control logic 50 to provide a stall signal back to the CPU 14 until a particular transaction 33 has completed. The CPU 14 is automatically stalled after writing the COP_SEND register 24 with the wait field 24H set. This is similar to a stall caused by the DTL 20 when the CPU writes a handle into a COP_RBUF_WAIT register 58 described below. However, the CPU 14 is immediately stalled at the initiation of a transaction 33 when the wait field 24H is set, but the stall can be somewhat delayed by selectively writing to the COP_RBUF_WAIT register 58. Setting the wait field 24H in COP_SEND register 24 also serves to save some CPU instructions since the CPU 14 does not have to also manipulate the handle in the COP_RBUF_WAIT register 58.

A release resource field 24G notifies the control logic 50 to automatically release allocated space in the RBUF 26 for a particular transaction after that transaction is completed. When set, the release resource field 24G tells the control logic 50 to immediately release RBUF resources and the handle when the associated transaction completes. If the field is clear, resources/handle are not released until the COP_RBUF_RELEASE register 60 is accessed with the proper handle. Setting the release field 24G in COP_SEND register 24 allows the CPU 14 to essentially "fire and forget" a transaction where it does not need to keep track of any returned data or acknowledgement. The release resource field 24G may be used for example for a write transaction that does not return data back in the response 32.

In addition to these functions, the control logic 50 conducts several other operations when the CPU 14 writes to the COP_SEND register 24. First, an RBUF region 24 is selected to receive response data 32 for the transaction 33. In one embodiment, it is guaranteed that at least one unused RBUF region 24 is available. If all the RBUF regions 24A-24D are in use, the control logic 50 sends an exception to the CPU 14.

The handle state for the selected RBUF region 24 is updated with the handle 40 associated with the transaction 33. To accomplish this, the current value of the handle counter 52 is read and stored in the count field 42F of handle 40. In addition, as described above, other values are extracted from the COP_SEND register 24 and stored in the appropriate fields of handle 40. Finally, the valid bit field 42C of the handle 40 is set confirming a valid handle.

COP_SEND_SELECT

Reading a COP_SEND_SELECT register 54 by the CPU 14 returns the last handle 40 written to the register 54. Writing the COP_SEND_SELECT register 54 updates the register 54 with a new descriptor handle 40. Although the COP_SEND_SELECT register 54 can be written by the CPU 14, generally it provides the last handle generated by the control logic 50 from a write of COP_SEND register 24. The COP_SEND_SELECT register 54 is read by the CPU 14 to acquire the handle generated by the last transaction launch pursuant to a write to COP_SEND register 24.

COP_RBUF_HANDLE

Reading a COP_RBUF_HANDLE register 56 conditionally returns the handle 40 stored in one of the four RBUF regions 26. The RBUF region 26 selected is based on the RBUF region ID field 42A for the handle 40 stored in the COP_SEND_SELECT register 54. The return of valid data may be conditional, in that the handle stored in COP_SEND_SELECT register 54 may be required to match the handle stored in the indexed RBUF region 26. If the handles do not match, an error may be returned.

Writing to the COP_RBUF_HANDLE register 56 conditionally updates the handle 40 stored in an associated region of the RBUF 26. The selected RBUF region 26A-26D is based on the RBUF region ID field 42A in the handle 40. When writing the COP_RBUF_HANDLE register 56, the new handle is provided as write data from the CPU 14. The value in RBUF region ID field 42A (FIG. 4) is extracted from this write data handle. The update of the RBUF region state may be conditional in that the handle 40 provided by the CPU 14 as write data may be required to also match the handle 40 associated with the RBUF region 26.

COP_RBUF_WAIT

The CPU 14 reads the COP_RBUF_WAIT register 58 to determine whether a transaction 33 is still outstanding or has completed. The control logic 50 uses the RBUF region ID field 42A of the handle 40 stored in the COP_SEND_SELECT register 54 to select one of the RBUF regions 26A-26D, and returns completion status information 58A for the transaction 33 associated with that identified RBUF region 26. If the transaction 33 associated with the handle 40 is still outstanding, a first value 58A may be returned when reading COP_RBUF_WAIT register 58, otherwise a different value 58A is returned indicating the transaction 33 has completed.

The return of valid status information 58A from COP_RBUF_WAIT register 58 may be conditional, in that the handle 40 stored in COP_SEND_SELECT register 54 may also be required to match the handle 40 stored in the indexed RBUF region 26A-26D. If the handle 40 in COP_SEND_SELECT register 54 does not match handle associated with the indexed RBUF region 26, then reading COP_RBUF_WAIT register 58 may return a same default value 58A regardless of the completion status of the associated transaction 33.

Writing to the COP_RBUF_WAIT register 58 by the CPU 14 causes the control logic 50 to stall the CPU 14 until the transaction 33 has completed. The write data delivered to the COP_RBUF_WAIT register 58 contains the handle 40. The handle 40 is assumed to have been managed somewhere by software 15 (FIG. 1). The RBUF region ID field 42A for this handle 40 selects an RBUF region 26A-26D, and the CPU 14 is stalled based on the completion status of the transaction 33 associated with the identified RBUF region 26.

The CPU 14 will be stalled if the wait field 42D is set for the handle 40 associated with the RBUF 26 and the associated transaction 33 has not completed. Writing to the COP_RBUF_WAIT register 58 automatically sets the value in wait field 42D for the identified RBUF handle 40. The state of handle 40 associated with the RBUF region may be conditional, in that the handle written into COP_RBUF_WAIT register 58 may also be required to match the handle stored in the RBUF region 26.

The stall generated by COP_RBUF_WAIT register 58 prevents the CPU 14 from having to constantly poll the DTL 20 for transaction status. For example, the control logic 50 generates a stall signal on control line 55 to the CPU 14 while the transaction 33 is still pending. The stall signal on control line 55 is de-asserted as soon as the control logic 50 determines the transaction 33 has completed. The CPU 14 accordingly can then continue processing operations.

For example, the CPU 14 may write to the COP_RBUF_WAIT register 58 for a transaction 33 that requests a lock on a particular portion of data. The CPU 14 knows that no further operations may be performed on the requested data until the transaction 33 requesting the lock is completed. The CPU 14 is free to operate other threads and issue other transactions while the thread associated with the lock transaction 33 is stalled. As soon as the lock transaction is completed, the control logic 50 removes the stall signal from control line 55 and the thread that previously wrote to the COP_RBUF_WAIT register 58 can continue processing.

As described above, the control logic 50 tracks the acknowledge count identified in field 24C of the COP_SEND register 24. When the acknowledgement count for the transaction 33 reaches the value set in field 24C (FIG. 5) of the COP_SEND register 24, the control logic 50 removes the stall signal on control line 55 to the CPU 14. The control logic 50 performs a similar operation when the wait field 24H is set in the COP_SEND register 24.

COP_RBUF_RELEASE

When the CPU 14 reads a COP_RBUF_RELEASE register 60, the association is released between a particular handle 40 and an RBUF region 26. In effect, this operation invalidates the RBUF state of the RBUF region 26. However, data in the RBUF 26 may be unaffected. At that point, it may not be possible to perform handle-based operations on the data or on the state information in that particular RBUF region 26. The state of the RBUF region 26 may be released by clearing an associated valid bit 27.

When the CPU 14 reads COP_RBUF_RELEASE register 60, an address pointer is returned (RBUF region ID) for the data in the RBUF region 26 containing the response data 32 for the transaction 33. The return of valid data from the COP_RBUF_RELEASE register 60 and the clearing or release of the associated RBUF region 26 is conditional. For example, the handle 40 associated with the COP_SEND_SELECT register 54 may be required to match the handle 40 stored in the indexed RBUF region 26. If the two handles do not match, the read operation may return a release abort value and the state of the referenced RBUF region 26 may remain unaffected.

Writing to the COP_RBUF_RELEASE register 60 is also used for releasing the association of a handle 40 with a particular RBUF region 26, in the same manner as a read from the COP_RBUF_RELEASE register 60. However, since this operation is a write, an address pointer to the associated region in RBUF 26 is not returned.

It is worth noting that the region in RBUF 26 upon which the write operation executes may be selected not by the contents of the COP_SEND_SELECT register 54, but by the handle 40 delivered in the write operation. The RBUF ID field 42A in the handle 40 selects an RBUF region 26. As with the read of COP_RBUF_RELEASE register 60, execution of a write to the COP_RBUF_RELEASE register 60 clears a valid bit 27 in the selected RBUF region 27. The update of the RBUF region state can also be conditional, in that the handle 40 referenced in the COP_RBUF_RELEASE command may be required to match the handle 40 stored in the referenced region of RBUF 26.

Accessing COP_RBUF_RELEASE 60 ensures that RBUF resources are released, preventing future resource conflicts. Handles are also released, decreasing the burden on software for managing large numbers of handles.

Figure 6:
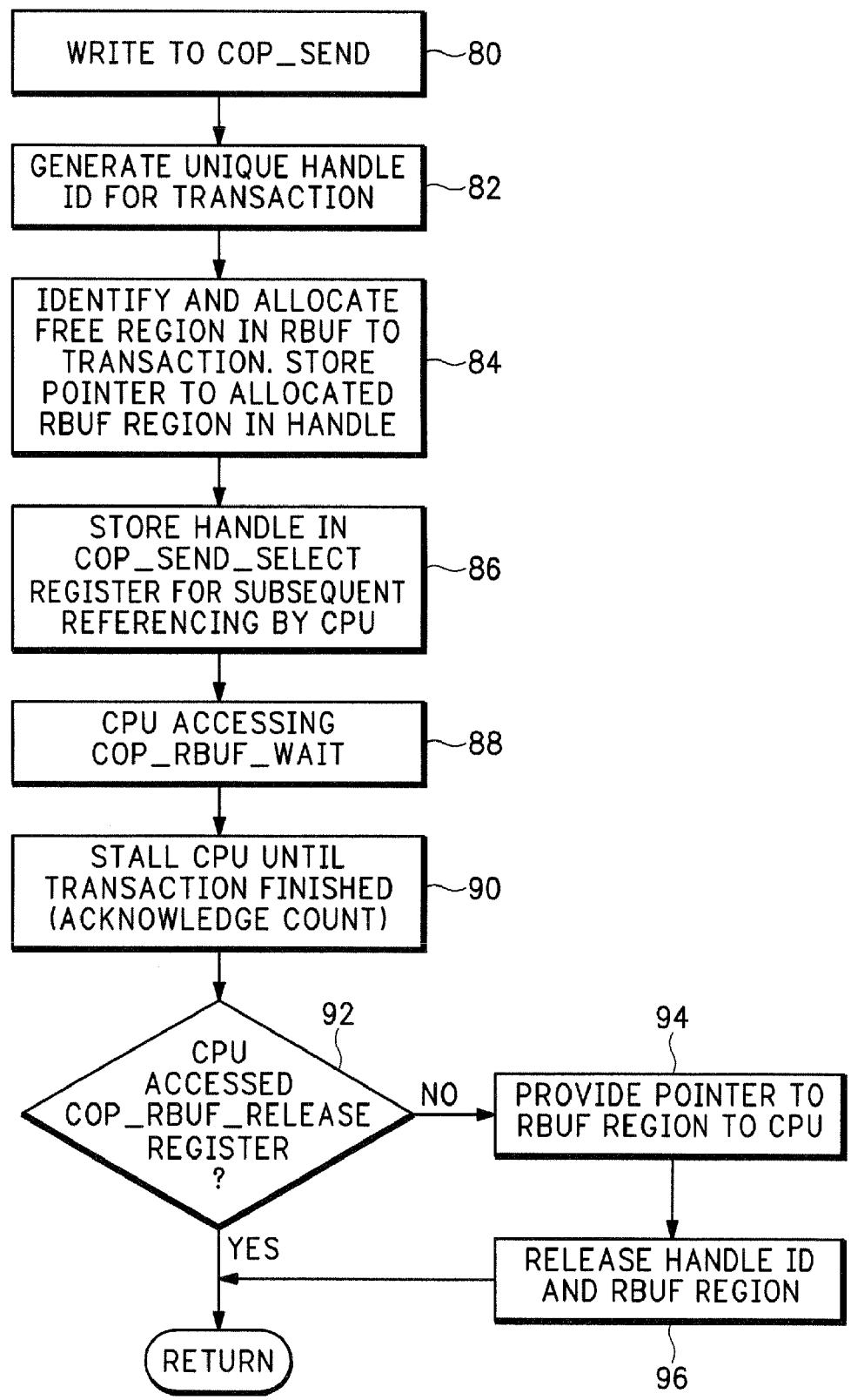
FIG. 6 is a flow diagram describing in more detail how the DTL in FIG. 1 uses handles to manage transactions.

FIG. 6 provides a summary of some of the handle based operations performed by the DTL 20. In operation 80, the DTL 20 detects the CPU 14 writing to the COP_SEND register. This causes the DTL 20 in operation 82 to automatically generate a handle with a unique transaction identifier. In operation 84, the DTL 20 identifies a free region in the RBUF 26 and associates the identified RBUF region with the handle. For example, the DTL 20 loads an RBUF region ID field 42A with the location of the identified RBUF region 26 and stores the unique transaction identifier into transaction ID field 42F. In operation 86, the DTL 20 stores the handle in the COP_SEND_SELECT register 54 which can then be subsequently referenced by the CPU 14.

If the CPU 14 accesses the COP_RBUF_WAIT register 58 in operation 88, and the handle associated with that register matches the handle for the associated region of RBUF 26, then the DTL 20 stalls the CPU 14 in operation 90. When the CPU 14 accesses the COP_RBUF_RELEASE register 60 in operation 92, and the handle associated with that register matches the handle in the associated RBUF region, the control logic 50 in operation 94 provides the CPU 14 with a pointer to the RBUF region that contains the response data 32 for the transaction 33. The DTL 20 then automatically releases the handle identifier and the RBUF region for use by another transaction.

Hiding Hardware Constraints

Figure 7:
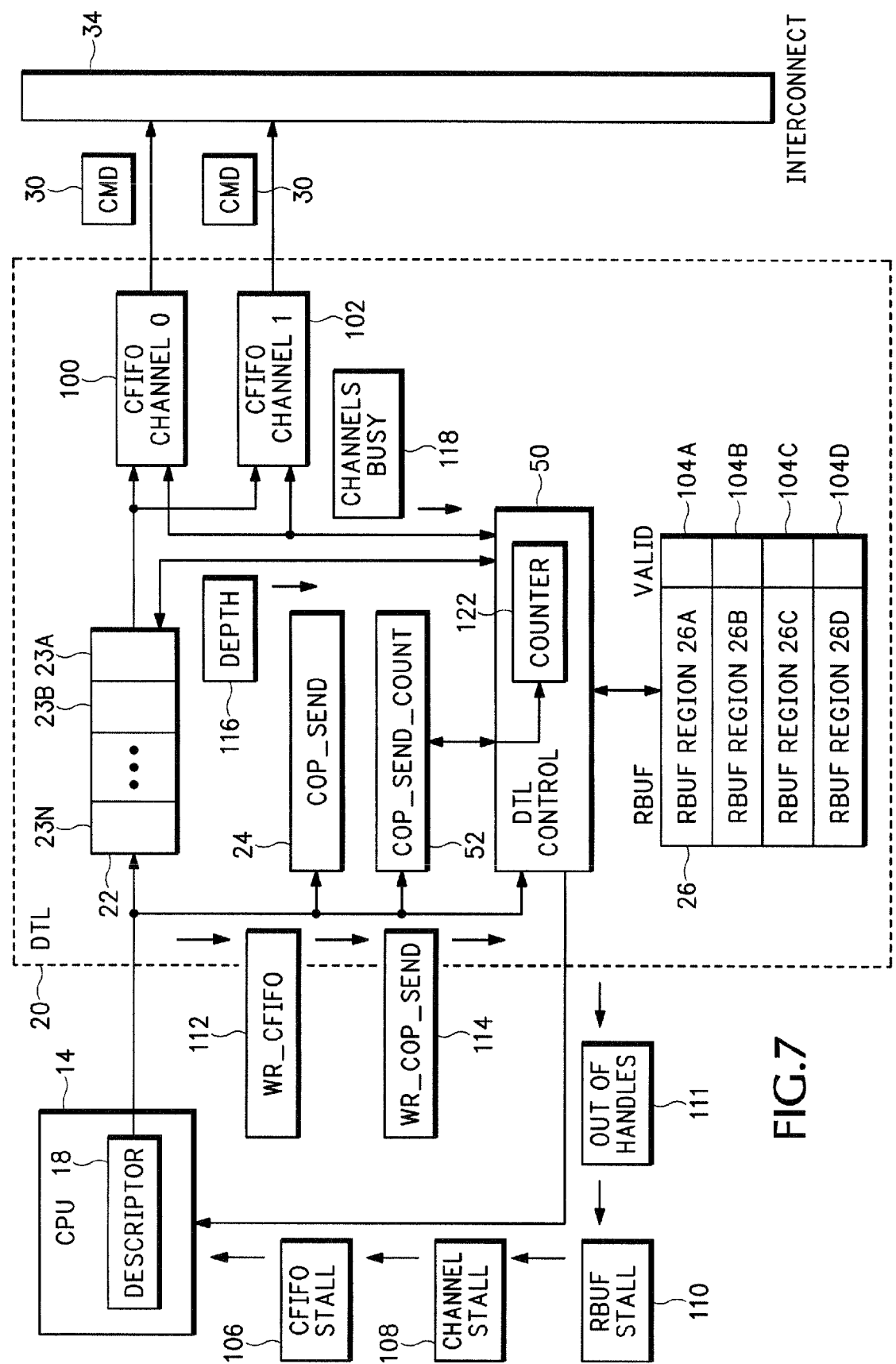
FIG. 7 is a diagram showing how the DTL hides certain hardware constraints from a Central Processing Unit (CPU).

Referring to FIG. 7, the DTL 20 abstracts or, in essence, hides certain hardware constraints and states from the CPU 14. As a result, the CPU 14 does not have to use processing cycles to monitor the availability of hardware resources when initiating transactions. Alternatively, these hardware resources are monitored by the DTL 20 and whenever an actual constraint is detected, a notification is sent from the DTL 20 to the CPU 14 possibly causing the CPU 14 to stall or alter processing operations. This relieves the CPU 14 from having to determine which entries 23 in the CFIFO 22 currently contain descriptor data 18, which descriptor entries 23 have been sent to resources, and which entries 23 are available in CFIFO 22 for loading more descriptor data 18.

In a first CFIFO interlock operation, the DTL control logic 50 tracks the number of available entries 23 by reading a depth value 116 from CFIFO 22. If all of the entries in CFIFO 22 are filled with descriptor data and the CPU 14 tries another write 112 to the CFIFO 22, the control logic 50 generates a CFIFO stall signal 106 that stops the CPU 14 from loading more data into CFIFO 22. When CFIFO entries 23 become free, the control logic 50 removes the CFIFO stall signal 106 and the CPU 14 continues loading descriptor data into CFIFO 22.

In a second DTL interlock operation, the DTL control logic 50 monitors the busy status 118 of two CFIFO channels 100 and 102 that can simultaneously send commands 30 from CFIFO 22 over the interconnect 34. Both CFIFO channels 100 and 102 may currently be busy as indicated by channel busy signal 118. If the CPU 14 tries to initiate another transaction by writing to the COP_SEND register 24 via write signal 114 during the asserted channel busy signal 118, the control logic 50 generates a channel stall signal 108 that causes the CPU 14 to stall the write 114 to the COP_SEND register 24.

When either of the channels 100 or 102 are no longer busy, the control logic 50 removes the channel stall signal 108 and the CPU 14 can then initiate the transaction by writing to COP_SEND register 24. This eliminates the CPU 14 from having to keep track of the number and status of the CFIFO channels. When only the channel stall signal 108 is generated and the CFIFO stall signal 106 is not currently asserted, the CPU 14 may continue to load descriptor data 18 into CFIFO 22 as long as there are available entries 23. The CPU 14 is also able to perform other operations that do not initiate transactions.

A third RBUF interlock operation manages the RBUF regions 26A-26D. As described above, the CPU 14 may send a write command 114 to the COP_SEND register 24 to initiate a new transaction previously queued in the CFIFO 22. In response to the COP_SEND register write 114, the control logic 50 tries to allocate a free region in RBUF 26. If all of the regions 26A-26D in RBUF 26 are currently allocated, the control logic 50 sends an error signal which causes an exception in the CPU 14. Valid bits 104A-104D in the RBUF regions 26A-26D, respectively, or some indicator, may be used to indicate the current allocation status.

The RBUF error signal 110 causes the CPU 14 to cancel the write 114 to COP_SEND register 24. The exception taken by the CPU 14 may invoke an exception handler routine that causes the CPU 14 to possibly scan through the regions in RBUF 26 that may be associated with completed transactions. The CPU 14 can then store the data from RBUF regions with completed transactions in other memory and release the handle and associated RBUF region. Software 15 may then return from the exception in a manner which allows the original write 114 to the COP_SEND register 24 to be reissued.

A COP_SEND_COUNT register 52 was briefly described above in FIG. 3 and is used to store the current unique handle value for a transaction. The handle value in counter 122 is incremented by the control logic 50 each time the CPU 14 successfully writes to the COP_SEND register 24 and initiates a new transaction. Any time the counter 122 reaches a highest value, a rollover exception is generated on the next write to COP_SEND register 24. The value in COP_SEND_COUNT register 52 can be written by the CPU 14, and the write data is then written to the counter 122. This allows the CPU 14 to control the count value, and, indirectly, can effect when a count limit is reached. When the count limit is reached, the control logic 50 generates an out of handle exception 111. The out of handle exception 111 then causes the CPU 14 to cancel the write 114 to the COP_SEND register 24.

The out of handle exception 111 can be used by the CPU 14 for debugging or to let the CPU 14 know when the DTL 20 is running out of unique transaction identifiers. For example, the count value can be set so that the highest count value is reached before an actual count overflow. The CPU 14 can then reset the counter 122 when all outstanding transactions have completed. This ensures unique handle values are used for all subsequent transactions.

The count value can also be used to set to some value that is associated with a processing error. For example, any group of transactions that cause the value in register 52 to reach some predetermined value may correspond to a processing error. The count value can be selected to notify the CPU 14 of these particular types of processing errors.

Transaction Errors

Figure 8:
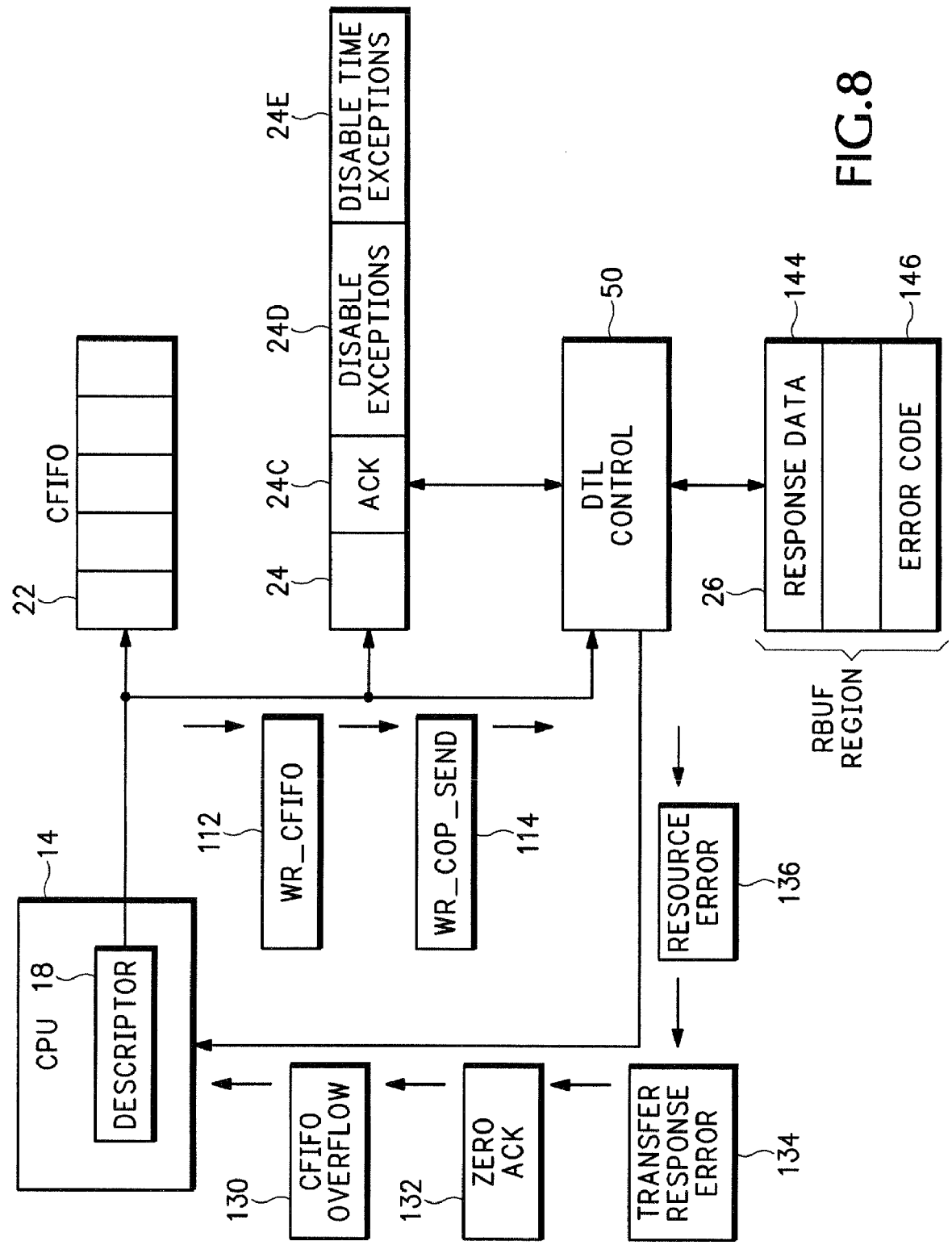
FIG. 8 shows some of the exceptions generated by the DTL.

Referring to FIG. 8, the DTL 20 may also generate other types of exception signals that are not associated with hiding hardware constraints. In some cases the control logic 50 will also save an error code which describes the class of error detected. A CFIFO overflow error signal 130 is generated by the control logic 50 when the CPU 14 writes too much data into the CFIFO 22 at one time without writing to COP_SEND register 24. The control logic 50 keeps track of the writes 112 to the CFIFO 22 and the writes 114 to the COP_SEND register 24. When the number of CFIFO writes 112 reaches some limit without the issuance of a COP_SEND write 114, the control logic 50 generates the CFIFO signal 130 indicating a programming error.

The DTL control logic 50 may also generate a zero acknowledge exception 132 when the CPU 14 loads a zero value into the acknowledge count field 24C of the COP_SEND register 24. Other exceptions can also be generated by the control logic 50 when the CPU 14 loads illegal values into any fields in any DTL registers that have been described above. The control logic 50 can also generate exception signals for parity errors for data in the RBUF 26 and can generate timeout errors when a particular transaction takes too much time to provide a response 32 (FIG. 1). These timeout values can be set in a DTL register by the CPU 14.

A transfer response error signal 134 is generated by the control logic 50 to notify the CPU 214 of a mismatch between the actual amount of response data 144 received by the control logic 50 and the amount of expected response data as specified by the value in acknowledge count field 24C. The control logic 50 may detect the mismatch when the response data 134 contains an end bit before the acknowledge count value have been reached or when the received response data reaches the acknowledge count before the end bit is received.

Resource Errors

A resource error is signaled when the error code returned from a resource is non-zero. Upon this detection, the DTL control logic 50 signals a resource error 136 to the CPU 14 and stores the error code at the end of the RBUF region 26 associated with the transaction. This immediately causes the CPU 14 to jump to an error handler routine where the error code 146 is read from the RBUF 26. Storing error codes 146 in the RBUF 26 eliminates having to provide special error registers.

Disabling Exceptions

As previously described above in FIG. 5, the CPU 14 can also write a value into the disable exception field 24D of the COP_SEND register 24 to prevent the control logic 50 from generating all or most types of the exception signals described above. A disable time field 24E of the COP_SEND register 24 is set by the CPU 14 to disable the control logic 50 from generating the timeout error signal described above. For example, certain packet processing transactions may never complete until a packet is received by a router or switch using the PPE 12 in FIG. 1. Accordingly, the CPU 14 can set field 24E for any transactions that may take an indeterminate amount of time to complete.

Memory Operations

Figure 9:
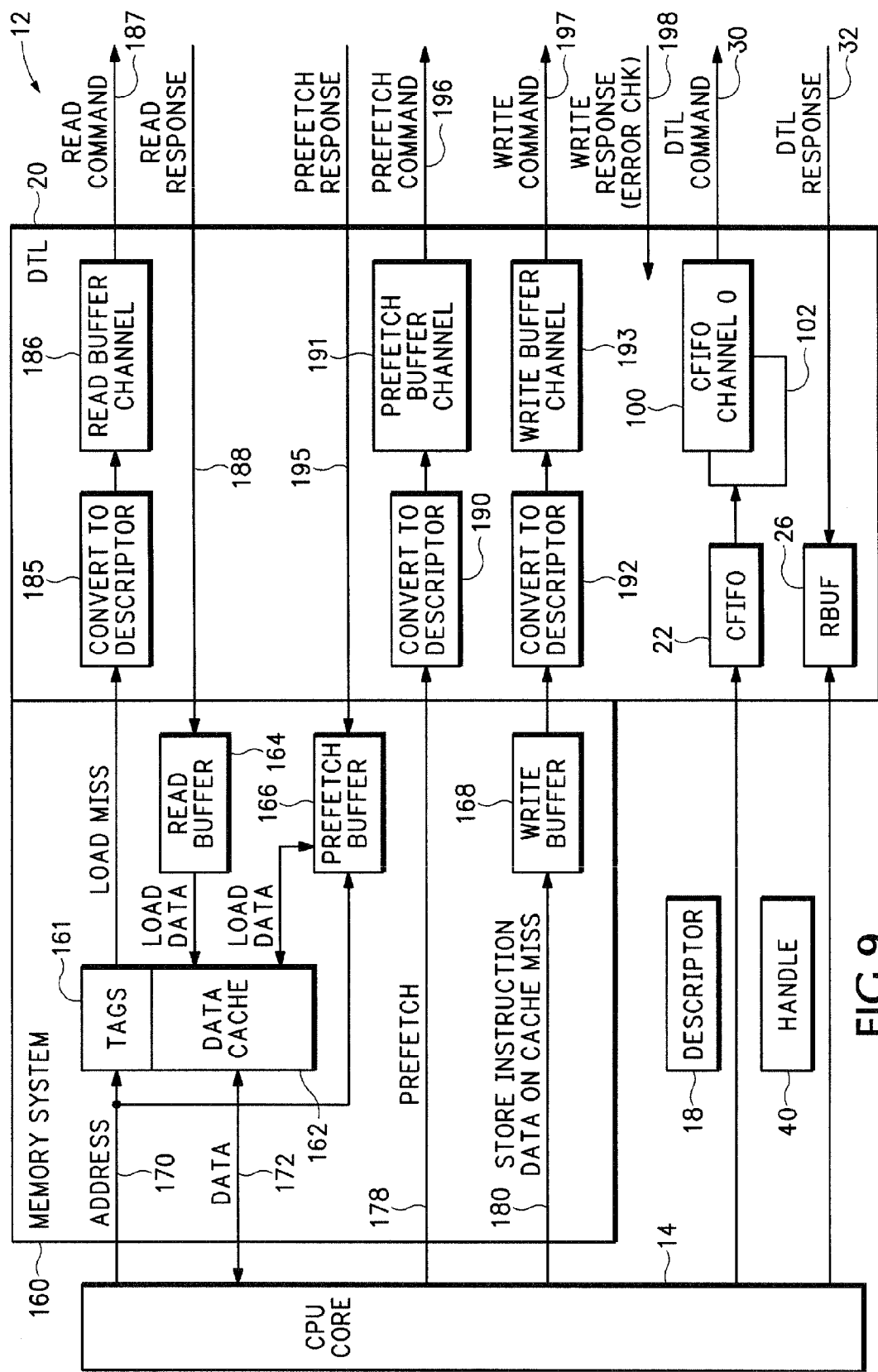
FIG. 9 shows how the DTL is used with a memory system.

FIG. 9 shows how the DTL 20 can also be used for memory operations. A memory system 160 may also be used as part of the PPE 12. The memory system 160 may include a data cache 162 and associated tags 161. The memory system 160 may also include a read buffer 164, a pre-fetch buffer 166, and a write buffer 168. The DTL 20 creates descriptors and manages associated transactions when the memory system 160 needs to access other memory resources.

With respect to the descriptors 18 generated by the CPU 14, the DTL 20 operates in the same manner as described above. The descriptor 18 is loaded into the CFIFO 22 and then output through one of the two CFIFO channels 100 or 102 as DTL commands 30. The DTL responses 32 are then stored in the appropriate region of RBUF 26. The CPU 14 then uses the RBUF pointer in handle 40 to read the response data 32 from RBUF 26.

If the CPU 14 conducts a read operation with an address 170 that misses with tags 161, the load miss is converted by logic 185 into a read descriptor. The read descriptor is loaded into a read buffer channel 186 and then output as a read command 187. The associated read response 194 returned back from the memory resource is loaded by the DTL 20 into the read buffer 164 and then the addressed data loaded into the cache 162.

The CPU 14 may generate a pre-fetch read request 178 that includes a pre-fetch address. The DTL 20 includes logic 190 that converts the pre-fetch read request into a descriptor. The logic 190 loads a command into a pre-fetch buffer channel 191 that then sends a pre-fetch read command 196 to the targeted memory resource. A pre-fetch response 195 is received back by the DTL 20 and forwarded to the pre-fetch buffer 166. If a subsequent read misses in cache 162, the pre-fetch buffer 166 can be interrogated. If the pre-fetch buffer 166 contains data for the requested address, the contents in pre-fetch buffer 166 are loaded into cache 162.

The CPU 14 may try to store data in cache 162. If the address 170 misses with the tags 161, the data is written into the write buffer 168. The logic 192 then converts the data in write buffer 168 into a descriptor. The logic 192 then loads a write command into write buffer channel 193 that then sends the write data out to the memory resource as a write command 197. The resource may respond back with an acknowledge response 198.

Multi-Threaded CPU

Figure 10:
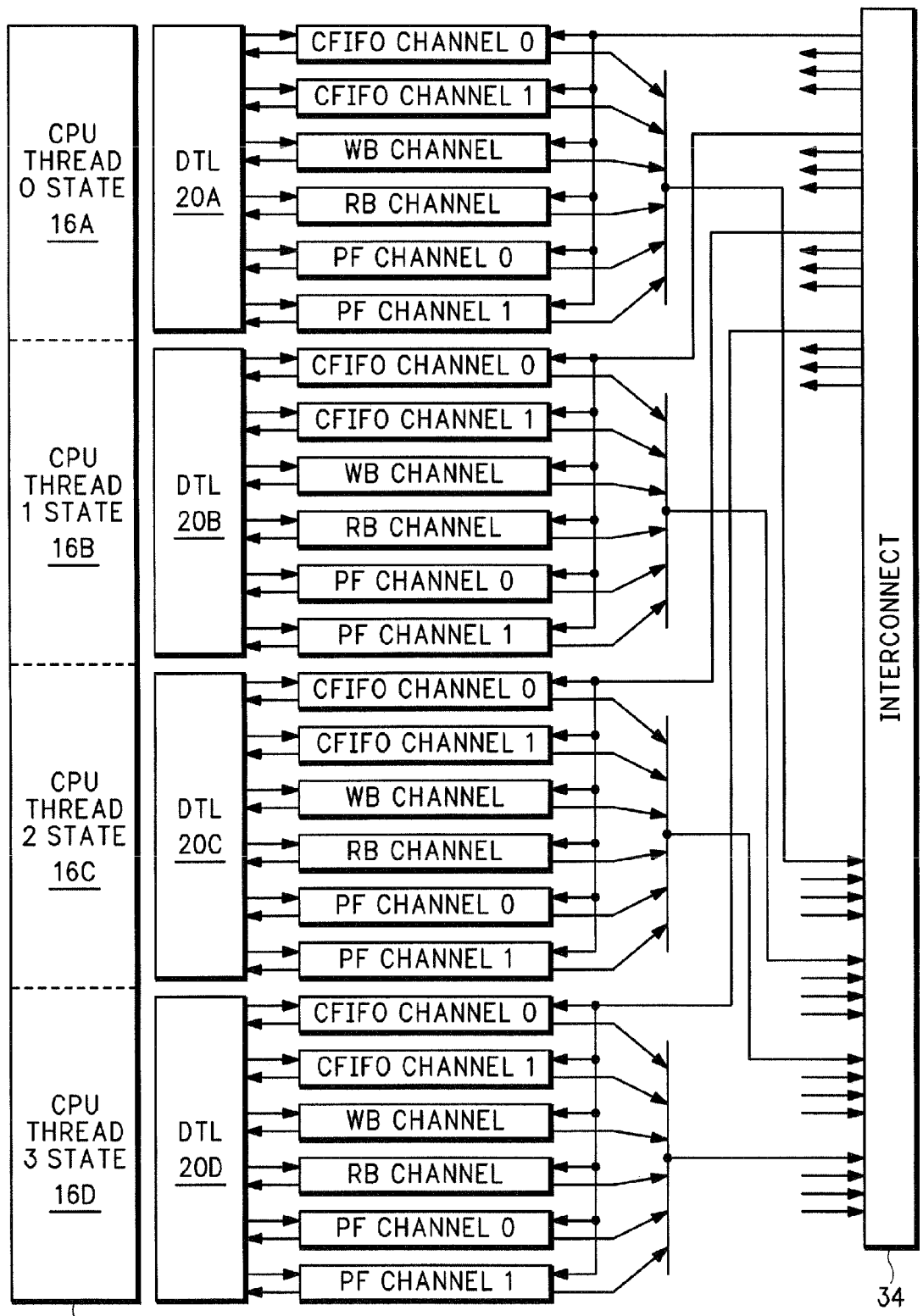
FIG. 10 shows how the DTL is used in a multi-threaded processor.

Referring to FIG. 10, the CPU 14 may operate multiple different software thread states 16A-16D. Separate DTLs 20A-20D are each associated with the different thread states 16A-16D in CPU 14, respectively. The DTLs 20A-20D each include the same registers and operate similarly to the DTL 20 described above. Each thread 16A-16D also has individual CFIFO channels, write buffer channels, read buffer channels and pre-fetch channels as also described above in FIG. 9.

The multithreaded CPU 14 can use software processing cycles previously used for managing a transaction 33 to now execute operations in the same or other threads. For example, a first thread 16A in the CPU 14 may send a descriptor to the associated DTL 20A. The thread 16A in the CPU 14 can then conduct other operations while the DTL 20A is managing the previously initiated transaction. Even if the thread 16A can not perform other tasks until a response to the descriptor is received back from a resource, the CPU 14 can still use the processing cycles previously spent managing that transaction to perform tasks in other threads 16B-16D.

Network Processor

Figure 11:
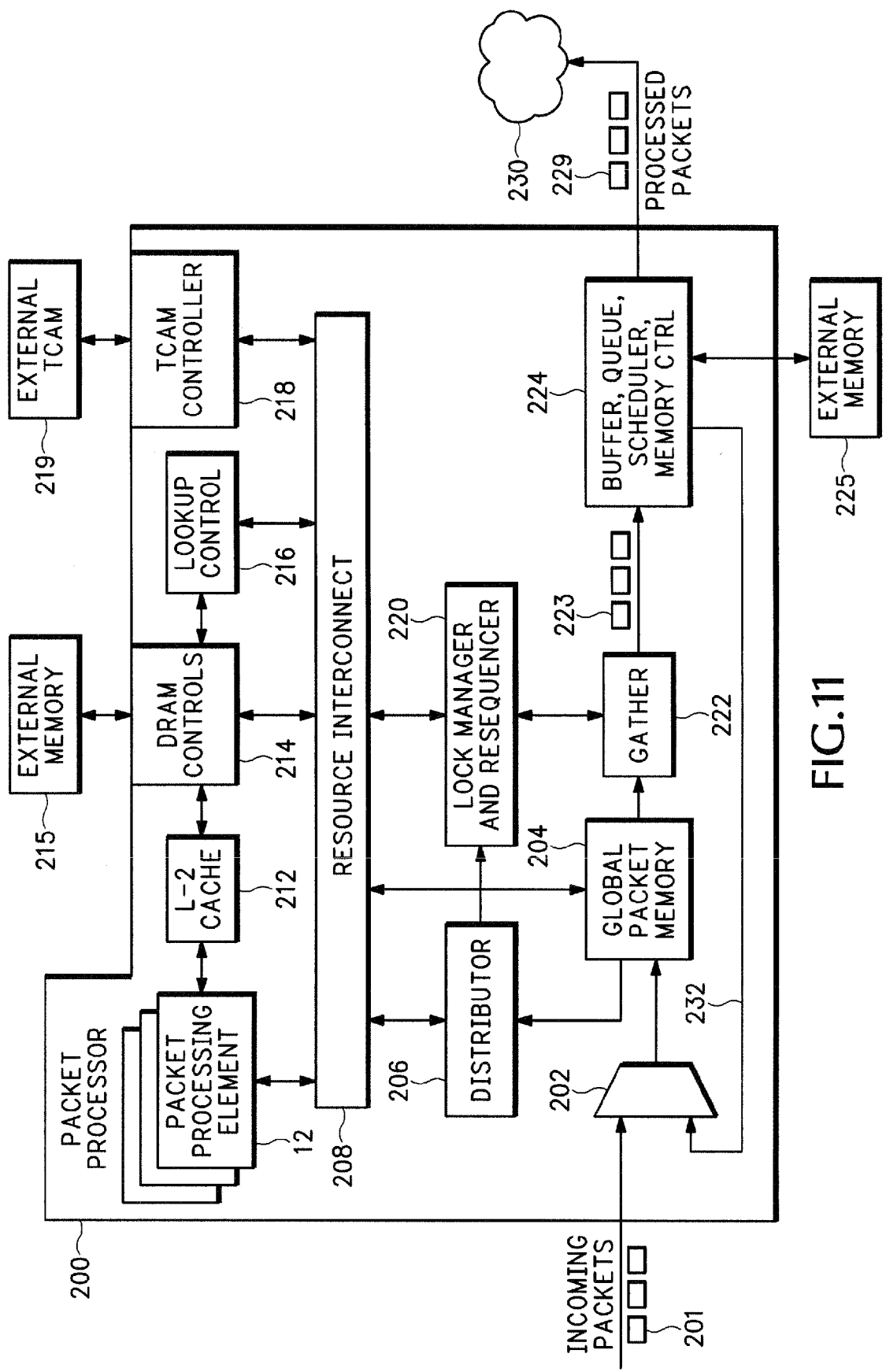
FIG. 11 shows how the DTL and PPE in FIG. 1 is used in a packet processor.

FIG. 11 is a block diagram of a multi-threaded network processor 200. The packet processor 200 is described in co-pending patent application Ser. No. 11/054,076, filed Feb. 8, 2005, entitled: MULTI-THREADED PACKET PROCESSING ARCHITECTURE, which is herein incorporated by reference.

Packets 201 are received by the packet processor 200 and typically stored in a Global Packet Memory (GPM) 204 via a multiplexer 202. After a packet is received, the GPM 204 builds an associated packet handle data structure and then enqueues the packet on a flow lock queue operated by a lock manager and resequencer 220. After receiving a reply back from the lock manager 220, the GPM 204 directs a distributor 206 to allocate the packet 201 to Packet Processing Elements (PPEs) 12 similar to those described above in FIGS. 1-10.

The PPEs 12 process the packets in the GPM 204 through a resource interconnect 208. The PPEs 210 may also use a Level-2 (L2) cache 212, Dynamic Random Access Memory (DRAM) controls 214, and lookup control 216 to access external memory 215. An external Ternary Content Addressable Memory (TCAM) 219 is also accessible by the PPEs 12 through the resource interconnect 208 and a TCAM controller 218. In one embodiment as described in FIG. 10, the PPEs 12 are multi-threaded. However, any generic processing unit with or without multi-threaded capability can be used.

The PPEs 12 inform the lock manager 220 when they have completed processing a packet. The PPEs 12 are then free to start processing other packets. After being processed by the PPEs 12, the packets continue to reside in the GPM 204 and may be stored in GPM 204 in a scattered non-contiguous fashion. A gather mechanism 222 is responsible for gathering and assembling the scattered portions of the packet back together. The lock manager 220 works with the gather mechanism 222 to determine the final order that the assembled packets 223 are sent from the GPM 204 to a Buffer, Queue, Scheduler (BQS) memory controller 224. The BQS 224 queues, schedules, and de-queues packets, offloading this time-consuming task from the PPEs 12. An external memory 225 is used by the BQS 224 as a packet buffer for, among other things, storing packets between different arrival and main processing operations. A recirculation path 232 is used by the BQS 224 to recirculate packets back to the GPM 204 for further processing by the PPEs 12.

Various specialized packet processing assists, such as a Forwarding Information dataBase (FIB) look-up, the TCAM access controller 218, atomic operations to memory, policers, Weighted Random Early Detection (WRED), hashing and modulus, and any other resource can also be used in the packet processor 200 to provide increased performance levels. Packet processing assists can also provide hardware atomic updates of known data structures in order to allow high performance updates to structures that represent large bandwidth flow through the network processor.

Resources in the packet processor 200 refer to any of these different functional elements that can be accessed by the PPEs 12. For example, the L-2 cache 212, external memory 215, external TCAM 219, GPM 204, and other co-processors are all considered resources.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
descriptor transfer logic coupled between a programmable general purpose processing element and resources and configured to receive descriptors generated by the processing element and manage transactions that sends the descriptors to the resources for execution and receives responses back from the resources in response to the sent descriptors,
the descriptor transfer logic further configured to manage the allocation and operation of buffers and registers that initiate the transaction, track the status of the transaction, and receive the responses back from the resources independently from the processing element, the descriptor transfer logic including a Command First-In First-Out buffer (CFIFO) configured to buffer multiple different batched resource instructions contained in the same or multiple different descriptors received from the processing element, and the descriptor transfer logic further configured to manage the transfer of the resource instructions from the CFIFO to the resources.

2. The apparatus according to claim 1 wherein:
the processing element comprises a Central Processing Unit (CPU) configured to generate the descriptors independently of the descriptor transfer logic;
the resources comprise multiple different computer or co-processing elements that process the resource instructions in the descriptors independently of the CPU;
the descriptor transfer logic is coupled between the CPU and through an interconnect to the multiple different computer or co-processing elements;
the CFIFO includes an input coupled to the CPU and an output coupled through the interconnect to the multiple different computer or co-processing elements; and
the descriptor transfer logic manages for the CPU monitoring the status of the resource instructions sent from the CFIFO to the resources.

3. The apparatus according to claim 2 wherein the descriptor transfer logic includes a send register that when written to by the CPU indicates to the descriptor transfer logic that a complete descriptor has been loaded into the CFIFO by the CPU and causes the descriptor transfer logic to take over management of the descriptor from the CPU and initiate the transaction for the descriptor currently in the CFIFO and associate subsequently loaded data in the CFIFO with a new descriptor.

4. The apparatus according to claim 3 wherein the descriptor transfer logic includes multiple channel buffers coupled between the CFIFO and the interconnect, wherein the channel buffers are configured to send out commands from the CFIFO, and the descriptor transfer logic is configured to generate a stall signal to the CPU preventing the CPU from writing to the send register when all of the channel buffers are busy.

5. The apparatus according to claim 3 wherein the send register includes a resource Id field identifying the resources targeted for the transaction associated with the descriptor in the CFIFO, a count field identifying an amount of buffer space the descriptor transfer logic should allocate to the transaction associated with the descriptor loaded in the CFIFO, and an acknowledge field indicating an amount of data the descriptor transfer logic should monitor for the transaction associated with the descriptor loaded in the CFIFO.

6. The apparatus according to claim 2 including a response buffer coupled between the CPU and the interconnect and having multiple regions each allocated to different transactions by the descriptor transfer logic independently of the CPU.

7. The apparatus according to claim 6 wherein the descriptor transfer logic generates a stall signal preventing the CPU from writing to the send register when the CPU tries to initiate a new transaction while all of the regions in the response buffer are already allocated.

8. A method comprising:
receiving descriptors with descriptor transfer logic, wherein the descriptors are generated by a programmable Central Processing Unit (CPU) and the descriptor transfer logic is located between the CPU and resources and the resources are other processors or memory used by the CPU for processing data;
managing a transaction for the CPU with the descriptor transfer logic, wherein the transaction includes the descriptor transfer logic sending the descriptors to the resources for execution;
receiving with the descriptor transfer logic responses back from the resources in response to the sent descriptors;
managing allocation and operation of buffers and registers that initiate the transaction, track the status of the transaction, and receive the responses back from the resources with the descriptor transfer logic independently of the CPU; and
providing the responses to the CPU for further processing.

9. The method according to claim 8 further comprising:
buffering multiple different batched resource instructions contained in the same or multiple different descriptors received from the CPU in a First In-First Out Buffer (FIFO) within the descriptor transfer logic, wherein the FIFO has an input coupled to the CPU and an output coupled through an interconnect to the resources;
monitoring for write operations from the CPU to a send register in the descriptor transfer logic;
initiating transfer of the batched resource instructions with the descriptor transfer logic responsive to the CPU writing to the send register; and
managing the transfer of the batched resource instructions from the FIFO to the resources with the descriptor transfer logic.

10. The method according to claim 8 further comprising:
receiving multiple different threads each independently operating different descriptor transfer logic, the different descriptor transfer logic each coupled between the CPU and the resources and each comprising separate command buffers, send registers, response buffers, and control logic configured to separately manage the transfer of commands to the resources and manage the receiving of associated responses data back from the resources.

11. The apparatus according to claim 2 wherein the description transfer logic includes control logic configured to generate handles associated with the descriptors in the CFIFO.

12. The apparatus according to claim 11 wherein the control logic is configured to assign a unique transaction identifier for each handle, allocate a region of a response buffer located in the descriptor transfer logic to the transaction, and identify the allocated region in the handle.

13. The apparatus according to claim 12 wherein the control logic is configured to compare a first handle currently being referenced by the CPU with a second handle currently associated with a region in the response buffer referenced by the first handle, and conditionally execute operations according to the comparison between the first and second handle.

14. The apparatus according to claim 11 wherein the descriptor transfer logic includes a wait register that when written to by the CPU causes the control logic to stall the CPU.

15. The apparatus according to claim 14 wherein the descriptor transfer logic includes a release register configured to reserve a region in the response buffer and further configured to release that region in the response buffer.

16. The apparatus according to claim 1 including multiple different independently operating descriptor transfer logic each configured to independently manage transactions for different threads operated by the processing element.

17. An apparatus, comprising:
a general purpose programmable processor core;
resources comprising multiple different computer or co-processing elements configured to perform operations responsive to commands contained in descriptors generated by the processor core;
descriptor transfer logic coupled between the processor core and through an interconnect to the resources, wherein the descriptor transfer logic includes:
a command buffer configured to buffer the descriptors generated by the processor core;
a send register configured to control management of the descriptors in the send register, initiation of associated transactions, and management of buffer transaction parameters associated with the descriptors;
a response buffer configured to storage response data associated with the transactions; and
control logic configured to manage handles for each of the transactions that include different fields that each contain different status information for the transactions, wherein the handles are stored in handle registers and read by the processor core to determine the status information for the transactions.

18. The apparatus according to claim 17 wherein each of the handles includes:
an identifier field containing a value uniquely identifying an associated transaction;
a pointer field containing a pointer value to a region in the response buffer where data from the associated transaction is stored; and
a wait field containing a value for stalling the processor core.

19. The apparatus according to claim 17 wherein the send register includes:
a resource Id field identifying the resources;
a response count field configured to manage an amount of total response data associated with the transactions, and
an acknowledge count field configured to manage an amount data associated with the transactions.

20. The method according to claim 8 further comprising:
writing data into a send register;
generating a unique handle identifier for the transaction according to data in the send register;
identifying and allocating a region of a response buffer to the transaction;
storing a pointer in the handle pointing to the region of the response buffer allocated to the transaction;
storing the handle in a select register for subsequent referencing by the CPU;
monitoring the CPU for access to the region of the response buffer; and
releasing the handle and the region of the response buffer after being accessed by the CPU.

* * * * *

UNITED STATES PATENT AND TRADEMARK OFFICE
CERTIFICATE OF CORRECTION

| | | |
|---|---|---|
| PATENT NO. | : 7,739,426 B1 | Page 1 of 1 |
| APPLICATION NO. | : 11/555066 | |
| DATED | : June 15, 2010 | |
| INVENTOR(S) | : Steiss et al. | |

It is certified that error appears in the above-identified patent and that said Letters Patent is hereby corrected as shown below:

At column 14, line 8, please replace "sends" with --send--.

Signed and Sealed this
Twenty-eighth Day of February, 2012

David J. Kappos
*Director of the United States Patent and Trademark Office*